United States Patent
Kalupner (10) Patent No.: US 10,131,390 B2
(45) Date of Patent: Nov. 20, 2018

(54) ANTI-THEFT DEVICE FOR A BICYCLE

(71) Applicant: NEXTBIKE GMBH, Leipzig (DE)

(72) Inventor: Ralf Kalupner, Leipzig (DE)

(73) Assignee: nextbike GmbH, Leipzig (DE)

( * ) Notice: Subject to any disclaimer, the term of this patent is extended or adjusted under 35 U.S.C. 154(b) by 0 days.

(21) Appl. No.: 15/536,695

(22) PCT Filed: Dec. 15, 2015

(86) PCT No.: PCT/DE2015/000593
§ 371 (c)(1),
(2) Date: Jun. 16, 2017

(87) PCT Pub. No.: WO2016/095890
PCT Pub. Date: Jun. 23, 2016

(65) Prior Publication Data
US 2017/0341691 A1    Nov. 30, 2017

(30) Foreign Application Priority Data

Dec. 16, 2014   (DE) .......................... 10 2014 018 476

(51) Int. Cl.
*E05B 71/00*   (2006.01)
*B62H 5/14*    (2006.01)
*B62H 5/20*    (2006.01)

(52) U.S. Cl.
CPC .............. *B62H 5/141* (2013.01); *B62H 5/145* (2013.01); *B62H 5/20* (2013.01)

(58) Field of Classification Search
None
See application file for complete search history.

(56) References Cited

U.S. PATENT DOCUMENTS

| | | | | |
|---|---|---|---|---|
| 4,459,833 A * | 7/1984 | Waterkamp | ............ | B62H 5/142 70/227 |
| 5,069,049 A * | 12/1991 | Shieh | ..................... | B62H 5/142 70/227 |
| 7,631,525 B1 * | 12/2009 | Kennealy | ............... | B62H 5/141 70/227 |
| 7,905,123 B2 * | 3/2011 | Lee | ........................ | B62H 5/145 70/226 |

(Continued)

FOREIGN PATENT DOCUMENTS

DE    202004002290 U1    7/2004
DE    102008020951 A1    10/2009

*Primary Examiner* — Brent Swarthout
(74) *Attorney, Agent, or Firm* — Laurence A. Greenberg; Werner H. Stemer; Ralph E. Locher (57) ABSTRACT

An anti-theft device for a bicycle includes a fork unit that has a first fork bar and a second fork bar. The first fork bar has a passage and the second fork bar has a receiving opening. A securing element can be arranged in the fork unit to pass through the first fork bar in the passage and engage in the receiving opening. The securing element passes through a spoke region of a front wheel of the bicycle. The securing element has an engagement contour that engages in the receiving opening. A locking unit with an electromechanical drive is arranged in the second fork bar. The locking unit has a locking contour, which is connected the electromechanical drive and engages in the engagement contour in the locking state. An electronic control unit controls the electromechanical drive to unlock the unit.

6 Claims, 4 Drawing Sheets

(56) References Cited

U.S. PATENT DOCUMENTS

2002/0083746 A1\* 7/2002 Cleveland ............... B62H 5/00
  70/233
2017/0069154 A1\* 3/2017 Hilton ................ G07C 9/00182

\* cited by examiner

ANTI-THEFT DEVICE FOR A BICYCLE

BACKGROUND OF THE INVENTION

Field of the Invention

The invention relates to an anti-theft device for a bicycle, in particular for use in a bicycle rental system.

Different approaches to secure a bicycle against theft are already known from the state of the art.

They mostly describe a chain, cable or U-lock which is used to connect the bicycle to a stationary structure so that the bicycle is secured.

A disadvantage of such bicycle locks is that they are always accessible from the outside and thus they can, depending on the material used, be destroyed and made ineffective by a thief without much effort.

A further disadvantage of such bicycle locks is the fact that the lock itself must be attached to the bicycle or carried by the cyclist separately, for example in a bag or in a backpack, when it is not in use. In any case, a certain additional effort is required for storing and carrying such a bicycle lock.

Furthermore, bicycle locks are known from prior art which provide anti-theft protection by a security bolt which is particularly provided in the rear wheel area and passes through the spoke area of the rear wheel when being locked so that the rear wheel is blocked.

Such bicycle locks have the particular disadvantages that only the rear wheel is blocked by the security bolt and thus only theft by cycling away can be prevented, and, moreover, all components of the bicycle lock providing security are also accessible from the outside.

Thus, the components of the bicycle lock can be accessed by a thief and are exposed to the effects of weather.

In particular, if a bicycle is used within a rental system open to the public, the components of the bicycle lock are mostly always exposed to the weather conditions which can possibly cause malfunction, particularly of the components responsible for locking the security bolt.

SUMMARY OF THE INVENTION

Therefore, the task of the invention is to overcome the disadvantages of the prior art by providing an anti-theft device for a bicycle, in particular for a bicycle of a bicycle rental system, which allows the use of different means of release authentication, is highly resistant against attempted theft and does not require any special effort for being transported or safely stored.

The task is solved by the features described in the independent claim(s). Preferred developments result from the depending claims.

An anti-theft device for a bicycle according to this invention comprises a fork unit having a first fork bar and a second fork bar, wherein the fork unit simultaneously fulfils the usual function of holding the front wheel of the bicycle.

According to this invention, the first fork bar has a passage and the second fork bar has a receiving opening. The receiving opening can pass partway or all the way through the second fork bar.

In the invention, the passage and the receiving opening are particularly positioned correspondingly opposite each other in the fork bars on a common central axis. Preferentially, the passage and the receiving opening are positioned at the same height. Depending on the specific application, the passage and the receiving opening can also be vertically offset.

Moreover, the anti-theft device of this invention comprises a securing element which is preferentially designed as a security bolt and which can be positioned in the fork unit in such a way that it passes the first fork bar in the passage area and engages in the receiving opening of the second fork bar.

The securing element is advantageously positioned in the fork unit such that the securing element passes through a spoke area of the front wheel of the bicycle so that the front wheel can be blocked by the securing element.

In this embodiment, the spoke area is meant to be the area of the front wheel in which the spokes are arranged and which is bordered by the rim at its outer circumference.

The securing element of this invention has an engagement contour at its first end which engages in the receiving opening. Here, the engagement contour is, for example, designed as a peripheral groove or as a borehole.

A further feature of the anti-theft device of this invention is a locking unit which is arranged in the second fork bar. According to the invention, the locking unit can be brought into a locking state or into an unlocking state.

In the present invention, the locking unit is provided with an electromechanical drive and a locking contour, wherein the locking contour is connected to the electromechanical drive. In the locking state, the locking contour engages in the engagement contour of the securing element.

The locking state is, for example, produced by a spring element which is connected under pre-tension to the locking contour and which, in the released state, pushes the locking contour into the engagement contour.

Alternatively, the locking state can also be achieved by applying only the locking contour weight force by means of which the locking contour is deliberately pushed into the engagement contour.

In contrast, the locking contour is not engaged in the engagement contour in the unlocking state.

According to this invention, the locking unit and, in particular, its electromechanical drive are furthermore connected to an electronic control unit, hereinafter also referred to only as control unit.

Preferentially, the control unit is designed as a computer and, particularly, as a bicycle computer. Bicycle computers are increasingly used for user identification purposes for bicycles belonging to bicycle rental systems.

A specific command, which can be a numerical code, is entered into the bicycle computer, for example via a touch screen, to produce the unlocking state.

The control unit converts this command into a control signal by means of which the electromechanical drive can be controlled.

After receiving and processing the control signal, the electromechanical drive can provide the unlocking state of the locking unit by leading the locking contour out of the engagement contour of the securing element. The electromechanical drive can be designed, for example, as a spindle drive or pull-type magnet.

The anti-theft device of this invention offers the technological advantage that the locking unit and thus all elements required for locking and unlocking the securing element are positioned inside the fork unit and are therefore protected against external influences.

Consequently, direct access to the locking unit and thus its manipulation are made impossible, in particular for a thief, so that the locking unit can only be disabled by force by partially or completely destroying the fork bar. However, the bicycle is rendered unusable after such an action and thus the thief cannot rapidly leave the scene of the theft by cycling away.

Compared to conventional devices, this anti-theft device can provide a much better protective effect.

Simultaneously, the locking unit inside the fork bar is protected against weather influences without any additional means so that, compared to conventional units positioned outside, a significantly longer service life of the anti-theft device can be reached.

A further advantage of the anti-theft device according to this invention is its spatial arrangement on the bicycle in the fork area.

As this position harmonizes with the normal way of using the bicycle, in particular when putting it in a bicycle stand, an extremely simple and user-orientated handling of the anti-theft device can be provided.

In a particularly advantageous further development of the anti-theft device, the outer side of the second fork bar is provided with a moulded body which is shaped, for example, like a mushroom head and has an engagement section.

In this solution, the outer side of the fork bar is its side facing away from the first fork bar.

According to the invention, the moulded body is designed in such a manner that it can be brought to a coupling state with a coupling element of a bicycle stand. In this context, the coupling element as well as the bicycle stand are not claimed to be elements of this invention.

In the coupling state, the engagement section of the moulded body engages in the undercut section of the coupling element, which has a cross-section designed, for example, as a T-groove for this purpose and into which the moulded body is shifted when the bicycle is put in the bicycle stand.

In this further development of the invention, the securing element is simultaneously designed such that it passes both through the receiving opening of the fork bar and through the moulded body in locking state.

In this case, the moulded body is provided with a passage, for example a through bore-hole.

The securing element is particularly designed in such a manner that in the coupling state between the moulded body and the coupling element it can be brought into an engaged state with a supporting opening of the coupling element.

In this refinement, the supporting opening of the coupling element is designed as a blind hole and allows, by means of a sectional embracing of the securing element, a positive fit in transverse direction relative to a central axis of the securing element.

Due to this positive fit, the coupling state between the moulded body and the coupling element is secured in the engaged state of the securing element such that, on the one hand, a movement of the front wheel in longitudinal direction is prevented by the positive fit and, on the other hand, a movement of the front wheel in transverse direction is prevented by the engagement of the engagement section in the undercut section.

This development offers the particular advantage that simultaneously to the anti-theft protection provided in the locking state of the anti-theft device, the bicycle can be securely placed in a bicycle stand designed for this purpose.

It is clear for the person skilled in the art that the moulded body and the coupling element must be adjusted to each other. This is particularly correct in the case of a bicycle rental system.

It is a special advantage of this further development that only one means and only one work step are required to simultaneously block the front wheel and establish a connection to a stationary structure.

It is another advantage that an easy integration of the anti-theft device of this invention in a bicycle rental system is made possible so that the stationary structure is provided by system bicycle stands then.

Moreover, in a further development a sensor, for example a limit switch, can be installed in the supporting opening as another advantage so that the occupancy status of the system bicycle stand can be evaluated or the correct engagement into the supporting opening can be signalized to the user.

In addition to this, a preferred development of the anti-theft device comprises a strand element, e.g. made of armoured-wire, which is assigned to the securing element.

In this embodiment, the strand element is connected to the securing element at a first strand end and to the fork unit at a second strand end.

In particular, the connection of the strand element to the fork unit can be provided such that the strand end has a pull-out section which can be pulled out of the fork unit or be pushed into the fork unit so that the strand element can be pushed into the fork unit as far as necessary when the securing element is not used. In the application, the strand element can be wound around a stationary structure, for example a lamp post, or around parts of a standard bicycle stand.

In this development, the special advantage of the strand element is the fact that a bicycle which must be protected against theft can be secured, beside the blockage of the front wheel which is achieved by the locking state provided by the anti-theft device, by attachment to a stationary structure, for example to a lamp post, or a standard bicycle stand.

In an alternative development, the second strand end of the strand element is connected to a main frame of the bicycle, with the frame not being part of this invention.

The strand element can also be connected to the main frame such that the strand element has a pull-out section which can be pulled out or pushed into the main frame.

In addition to the advantageous double protection of the bicycle by its attachment to a stationary structure and by the blockage of the front wheel disclosed in a dependent claim, this variant offers the particular advantage that in the locking state of the anti-theft device the fork unit is also additionally protected against undesired dismantling in the event of attempted theft thanks to the indirect connection to the main frame via the strand element.

A further development, which combines the features of dependent claims, offers the particular advantage that also the main frame is secured at a stationary structure when the bicycle is placed in a system bicycle stand because the fork unit can be connected to the system bicycle stand via the molded body and the securing element, and the main frame can be indirectly connected to the system bicycle stand via the securing element and the strand element.

In another advantageous development, the fork unit is provided with a holding unit for holding the securing element.

The holding unit is designed, for example, as a clamping device and particularly allows the securing element to be reliably held and fixed when not in use.

In this solution, the holding unit can be arranged directly on the fork unit or in the region of the main frame of the bicycle.

A preferred further development of the anti-theft device also provides that the locking unit and the control unit are connected to each other by wire or wireless and that a status information concerning the locking state or the unlocking state of the locking unit can be transmitted via this connection from the locking unit to the control unit.

In particular, the status information transmitted can be visualized by the control unit so that a user of the bicycle can be informed about the current operating status of the anti-theft device and about the correct setting of the locking state or of the unlocking state.

The connection between the locking unit and the control unit is preferentially the same connection which connects the control unit to the electromechanical drive of the locking unit and which is used to transmit the appropriate control signal for providing the unlocking state.

Moreover, in an advantageous development the electronic control unit of the anti-theft device of the invention is provided with means for wireless data transmission, wherein the means for wireless data transmission are hereinafter referred to as means of transmission.

It is of particular advantage that the means of transmission of this embodiment allow a wireless connection of the control unit to a central data unit which is, for example, a terminal or a peripheral data base of a bicycle rental system. The central data unit does not constitute a part of this invention.

The means of transmission can, for example, transmit the status information as to locking or unlocking state, specified in a dependent claim, from the control unit to the central data unit and save it there.

If, in particular, the central data unit is a decentral database of a bicycle rental system, the corresponding status information can be transmitted to the individual operator of the bicycle rental system so that he can always be informed about the status of the corresponding anti-theft device.

Moreover, if the central data unit is designed as a terminal of a bicycle rental system, a corresponding control command for providing the unlocking state of the anti-theft device can be directly entered at the terminal via the means of transmission and transmitted from there to the control unit. In this way, the process of unlocking the anti-theft device can be optimized and made user-friendly in such a bicycle rental system.

BRIEF DESCRIPTION OF THE SEVERAL VIEWS OF THE DRAWING

The anti-theft device according to this invention is explained in more detail by embodiments according the following figures. They show.

DESCRIPTION OF THE INVENTION

Figure 1:
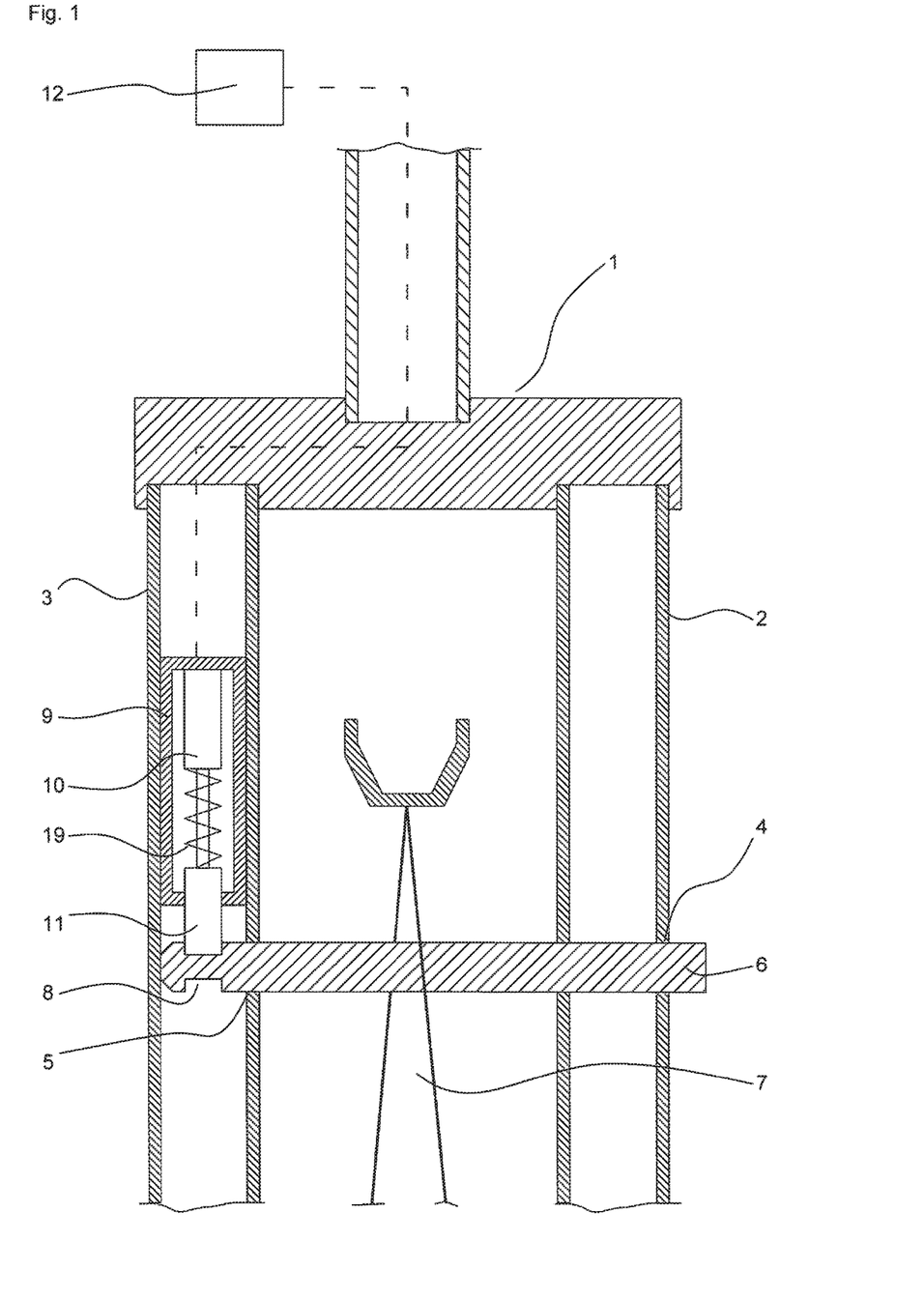
FIG. 1 Schematic sectional view—basic version
  FIG. 2 Schematic sectional view with moulded body
  FIG. 3 Schematic sectional view with strand element
  FIG. 4 Schematic sectional view in deactivated state.

FIG. 1 shows an exemplary embodiment of the anti-theft device for a bicycle in a basic version.

According to this invention, the anti-theft device comprises a fork unit 1 with a first fork bar 2 and a second fork bar 3, wherein the first fork bar 2 has a passage 4 and the second fork bar 3 has a receiving opening 5.

Moreover, the anti-theft device comprises a securing element 6 which is designed as a securing bolt in this invention and can be arranged in the fork unit 1 in such a way that it passes through the first fork bar 2 in the region of the passage 4 and engages in the receiving opening 5 of the second fork bar 3. The securing element 6 is furthermore arranged such that it can be passed through a spoke region 7 of a front wheel (only simplified representation in the figure), i.e. through the free space between two spokes of the spoke region 7.

According to the invention, the securing element 6 is provided with an engagement contour 8 which is designed as a peripheral circular groove and, in the arrangement of the securing element 6 shown in FIG. 1, it is positioned in the second fork bar 3.

In this embodiment, the engagement contour 8 is designed in such a manner that a locking contour 11 can engage in it.

Figure 2:
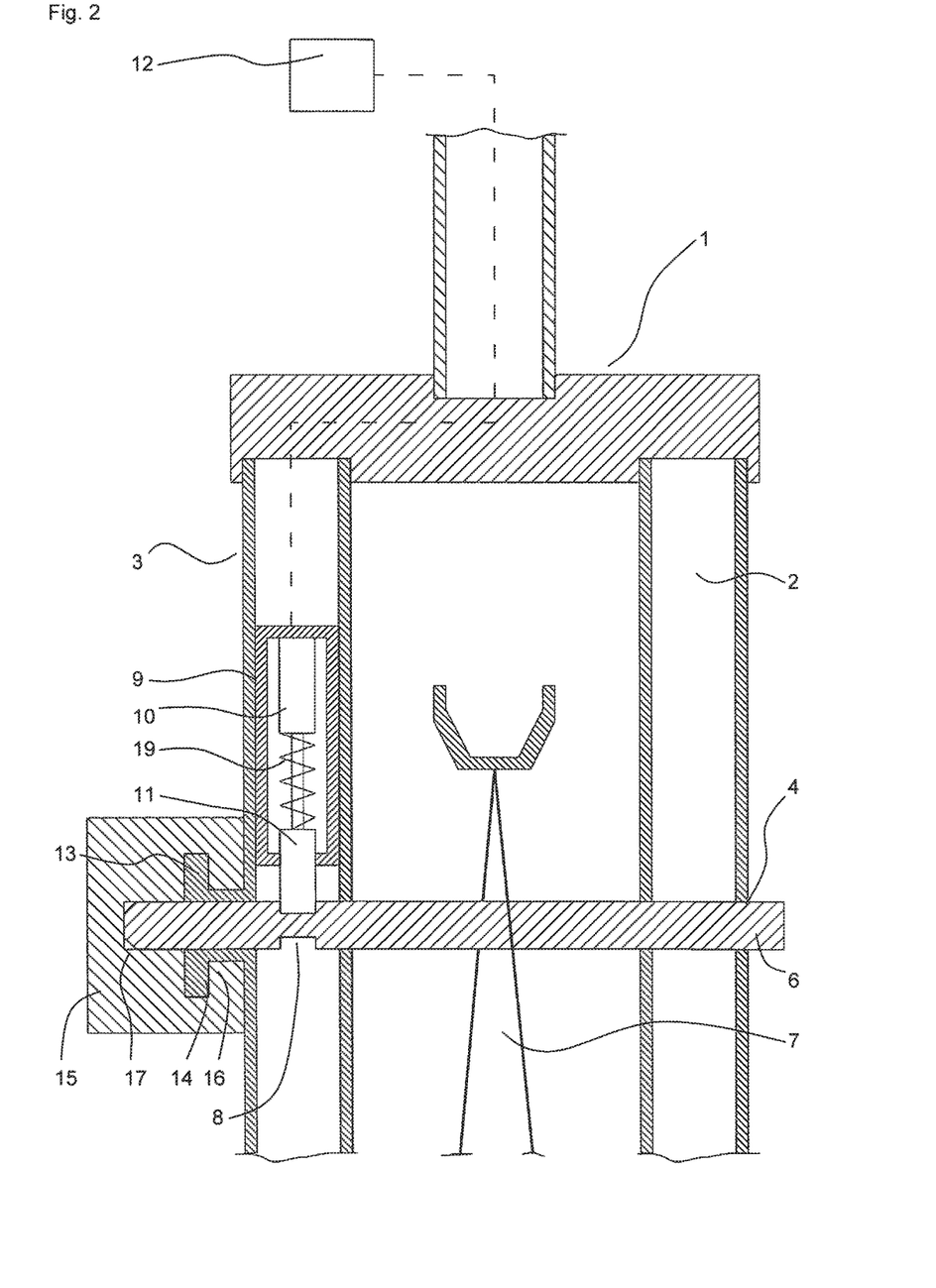
Figure 3:
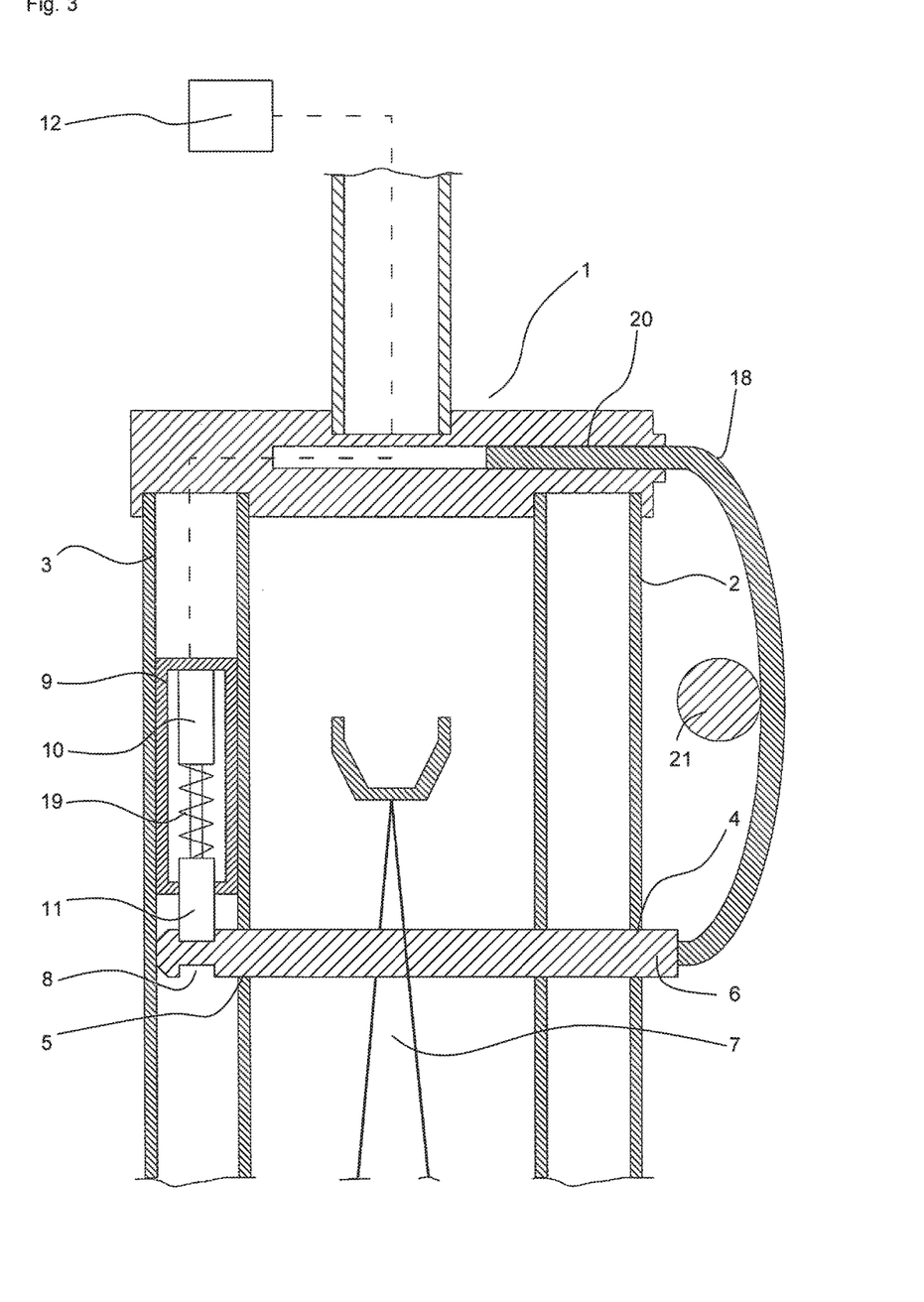

The locking contour 11 is, as illustrated in FIGS. 1 to 3, a part of the locking unit 9 which is positioned in the second fork bar 3 and is furthermore provided with an electromechanical drive 10.

Here, the electromechanical drive 10 is designed as a spindle element and is connected to the locking contour 11.

In the present embodiments, the locking unit 9 and, in particular, the electromechanical drive 10 are connected to a control unit 12 which is, for example, a bicycle computer.

Furthermore, the locking unit 9 can adopt a locking state or an unlocking state.

The locking state provides that, in particular, a positive-fit engagement is established between the locking contour 11 and the engagement contour 8, wherein the locking contour 11 is slid into the engagement contour 8 by a force applied by means of a spring element 19. The engagement of the locking contour 11 in the engagement contour 8 effectively prevents the securing element 6 from being pulled out of the receiving opening 5 and thus prevents the anti-theft device from being ineffective. The locking state is the state of the anti-theft device in which it is active and in which the front wheel of the bicycle is effectively blocked by means of the securing element 6.

In contrast, the unlocking state of the locking unit 9 provides that the engagement of the locking contour 11 in the engagement contour 2 is released so that the securing element 6 can be pulled out of the receiving opening 5 and thus the anti-theft device can be deactivated.

The unlocking state is provided by means of the electromechanical drive 10 which, after receiving a corresponding control command from the control unit 12, pulls the locking contour 11 out of the engagement contour 8 and thus releases the positive-fit engagement. Here, the control command is triggered by a specified release code input in the control unit 12.

A further embodiment of the anti-theft device is shown in FIG. 2.

In this embodiment, the second fork bar 3 is equipped with a moulded body which is shaped, for example, like a mushroom head and has an engagement section 14.

By means of the moulded body 13, the fork unit 1 of the anti-theft device can be supported in a coupling element 15 of the bicycle stand (not shown).

The support is achieved in such a way that the fork unit 1 with the moulded body 13 is shifted horizontally into the coupling element 15 up to a defined end position, for example provided by an limit stop, wherein the engagement area 14 of the moulded body 13 engages in an undercut section 16 of the coupling element 15 so that a positive fit can be established between the moulded body 13 and the coupling element 15 in the direction of a central axis of the securing element 6.

In addition to this, the securing element 6 of the embodiment represented in FIG. 2 is designed such that, in particular in the locking state, it passes through the second fork bar 3 and the moulded body 13 and engages in a supporting opening 17 of the coupling element 15. In this embodiment, the supporting opening 17 is a blind hole and particularly designed such that in its area the securing element 6 is at least partially surrounded at its external circumference by the coupling element 15 and thus a positive fit is provided between the securing element 6 and the coupling element 15 transversely to the central axis of the securing element 6.

In the embodiment just described, the anti-theft device provides the particular advantage that in addition to the blockage of the front wheel of the bicycle the bicycle can be securely supported in a bicycle stand, wherein in the case of such a support in the bicycle stand the fork unit 1 can be prevented from being pulled out of the bicycle stand in the longitudinal direction of the bicycle thanks to the positive fit established between the securing element 6 and the coupling element 15.

The embodiment of the anti-theft device described here is particularly suited for bicycles which are used within bicycle rental systems with system bicycle stands at different locations such as stations or central places.

FIG. 3 shows another embodiment of the anti-theft device according to this invention.

In this embodiment, a strand element 18 is additionally assigned to the securing element 6. Said strand element 18 mainly consists of armoured wire and is connected to the securing element 6 at a first strand end and to the fork unit 1 at a second strand end.

In the connection region between the strand element 18 and the fork unit 1, the strand element 18 has a pull-out section 20 which can be pulled out of the fork unit 1 or be pushed into it, wherein a stopping element (not shown) prevents the strand element 18 from being completely pulled out of the fork unit 1.

As a particular advantage, the strand element 18 allows an additional attachment of the fork unit 1 or the bicycle to a stationary structure 21, for example a bicycle stand, wherein, before the securing element 6 is pushed into the passage of the first fork bar 2, the strand element 18 is wound around the stationary structure 21 so that the latter is enclosed between the fork unit 1 and the strand element 18.

Moreover, the strand element 18 provides an additional protection of the securing element 6 against loss when the anti-theft device is not in use. In particular, the pull-out section 20 makes it possible for the strand element 18 to be pushed as far into the fork unit 1 as to prevent the strand element 18 from becoming caught on further stationary structures or prevent the strand element 18 from engaging in the spoke region 7 unintentionally.

Figure 4:
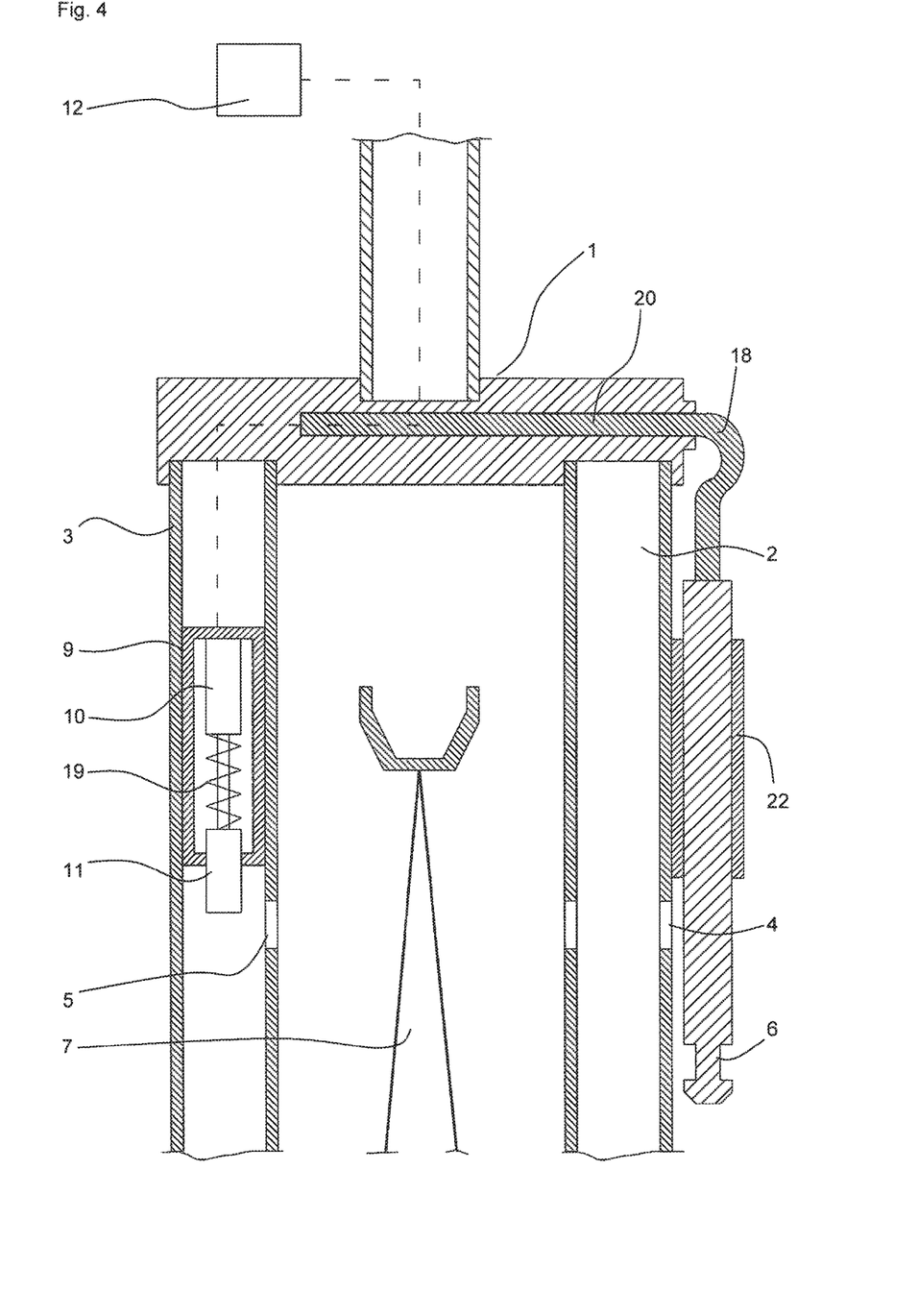

In addition, FIG. 4 shows a further embodiment of the anti-theft device in a deactivated state, for example when the bicycle belonging to it is used.

As illustrated in FIG. 4, a holding unit 22 is assigned to the fork unit 1 and said holding unit 22 is designed as a clamping element made of plastic material and can hold the securing element 6 when the anti-theft device is deactivated.

As also shown in FIG. 4, the strand element 20 is pushed into the fork unit 1 as far as necessary in the deactivated state of the anti-theft device.

LIST OF REFERENCE NUMERALS 1 fork unit
2 first fork bar
3 second fork bar
4 passage
5 receiving opening
6 securing element
7 spoke region
8 engagement contour
9 locking unit
10 electromechanical drive
11 locking contour
12 control unit
13 moulded body
14 engagement section
15 coupling element
16 undercut section
17 supporting opening
18 strand element
19 spring element
20 pull-out section
21 stationary structure
22 holding unit

The invention claimed is:

1. An anti-theft device for a bicycle, comprising:
a fork unit having a first fork bar and a second fork bar, said first fork bar having a passage and said second fork bar having a receiving opening;
a securing element for being disposed in said fork unit and for passing through said first fork bar in a region of said passage, said securing element for engaging in said receiving opening of said second fork bar, said securing element passing through a spoke region of a front wheel of the bicycle, said securing element having an engagement contour at a first end that enters into said receiving opening;
a locking unit being disposed in said second fork bar and having an electromechanical drive, said locking unit for being brought into a locking state or into an unlocking state, said locking unit having a locking contour connected to said electromechanical drive, said locking contour engaging in said engagement contour in the locking state and the engaging of said locking contour in said engagement contour being released in the unlocking state;
said second fork bar being equipped, on an outer side thereof, with a molded body having an engagement section, said molded body being constructed for being brought to a coupling state with a coupling element of a bicycle stand, in the coupling state said engagement section engaging in an undercut section of the coupling element, said securing element being constructed for passing through said receiving opening of said second fork bar and through said molded body, in the locking state, with said securing element in an engaged state with a supporting opening of the coupling element in the coupling state, the coupling state being secured by the engaged state;
an electronic control unit being connected to said electromechanical drive, for controlling said electromechanical drive and providing the unlocking state.

2. The anti-theft device according to claim 1, wherein a strand element is assigned to said securing element and is connected thereto at a first strand end and said strand element is connected to said fork unit at a second strand end.

3. The anti-theft device according to claim 1, wherein a strand element is assigned to said securing element and is connected thereto at a first strand end and said strand element is connected to a main frame of the bicycle at a second strand end.

4. The anti-theft device according to claim 1, wherein a holding unit is assigned to said fork unit to hold said securing element.

5. An anti-theft device for a bicycle, comprising:

a fork unit having a first fork bar and a second fork bar, said first fork bar having a passage and said second fork bar having a receiving opening;

a securing element for being disposed in said fork unit and for passing through said first fork bar in a region of said passage, said securing element for engaging in said receiving opening of said second fork bar, said securing element passing through a spoke region of a front wheel of the bicycle, said securing element having an engagement contour at a first end that enters into said receiving opening;

a locking unit being disposed in said second fork bar and having an electromechanical drive, said locking unit for being brought into a locking state or into an unlocking state, said locking unit having a locking contour connected to said electromechanical drive, said locking contour engaging in said engagement contour in the locking state and the engaging of said locking contour in said engagement contour being released in the unlocking state;

an electronic control unit being connected to said electromechanical drive, for controlling said electromechanical drive and providing the unlocking state;

a status information as to the locking state or the unlocking state of said locking unit being transmitted from said locking unit to said electronic control unit via a connection between said locking unit and said electronic control unit.

6. The anti-theft device according to claim 1, wherein said electronic control unit is provided with means for wireless data communication.

\* \* \* \* \*